(12) United States Patent
Roll et al.

(10) Patent No.: US 8,079,624 B2
(45) Date of Patent: Dec. 20, 2011

(54) BUMPER OF A MOTOR VEHICLE

(75) Inventors: Michael Roll, Bielefeld (DE); Elmar Mollemeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 40 days.

(21) Appl. No.: 12/686,723

(22) Filed: Jan. 13, 2010

(65) Prior Publication Data

US 2010/0176610 A1   Jul. 15, 2010

(30) Foreign Application Priority Data

Jan. 13, 2009   (DE) .......................... 10 2009 004 827

(51) Int. Cl.
*B60R 19/02* (2006.01)
(52) U.S. Cl. ............... 293/102; 296/187.03; 296/187.09
(58) Field of Classification Search .................. 293/102, 293/120, 121, 122, 132; 296/187.01, 187.03, 296/187.09, 193.01, 193.09
See application file for complete search history.

(56) References Cited

U.S. PATENT DOCUMENTS

| | | | |
|---|---|---|---|
| 6,349,521 B1 | 2/2002 | McKeon et al. | |
| 6,863,321 B2 * | 3/2005 | Jonsson et al. | 293/102 |
| 6,923,482 B2 * | 8/2005 | Cumming et al. | 293/102 |
| 7,290,811 B1 * | 11/2007 | Arns | 293/133 |
| 7,316,432 B2 * | 1/2008 | Muskos | 293/102 |
| 7,357,432 B2 * | 4/2008 | Roll et al. | 293/133 |
| 2004/0217607 A1 | 11/2004 | Bladow et al. | |

FOREIGN PATENT DOCUMENTS

| | | |
|---|---|---|
| DE | 198 49 358 C2 | 5/2000 |
| DE | 60 2005 004 442 | 11/2005 |
| DE | 10 2005 017 956 | 10/2006 |
| EP | 1 730 002 B1 | 9/2007 |
| EP | 1 723 008 B1 | 1/2008 |
| WO | WO 2006/126941 A1 | 11/2006 |

* cited by examiner

*Primary Examiner* — Dennis Pedder
*Assistant Examiner* — Jason S Daniels
(74) *Attorney, Agent, or Firm* — Henry M. Feiereisen; Ursula B. Day

(57) ABSTRACT

A bumper of a motor vehicle includes a cross member which is disposed transversely to a side rail of a motor vehicle frame and has a U-shaped cross section formed by a wall and two legs extending from opposite ends of the wall Extending longitudinally in a direction of the cross member is a reinforcement member which has a T-shaped cross section and closes off a front end of the cross member.

17 Claims, 1 Drawing Sheet

BUMPER OF A MOTOR VEHICLE

CROSS-REFERENCES TO RELATED APPLICATIONS

This application claims the priority of German Patent Application, Serial No. 10 2009 004 827.8, filed Jan. 13, 2009, pursuant to 35 U.S.C. 119(a)-(d), the content of which is incorporated herein by reference in its entirety as if fully set forth herein.

BACKGROUND OF THE INVENTION

The present invention relates, in general, to a bumper for a motor vehicle.

The following discussion of related art is provided to assist the reader in understanding the advantages of the invention, and is not to be construed as an admission that this related art is prior art to this invention.

Bumpers for motor vehicles are typically arranged across the front and rear of a motor vehicle to absorb energy caused by an impact and thus to prevent as far as possible damage to the vehicle body structure. A bumper typically includes a cross member which can be fixed transversely to the side rails of the motor vehicle frame, with crash boxes being placed in-between. The cross member is provided to deflect the energy, generated in the event of an impact, into the crash boxes which convert the impact energy into deformation work.

Bumpers must meet official regulations as well as the demands established by consumer protection agencies to protect passengers. In addition, insurers have established classification tests (RCAR Research Council for Automobile Repairs, GDV Gesamtverband der Deutschen Versicherungswirtschaft [Association of German Insurers]), which must also be met. At the same time, the automobile industry demands optimal utilization of installation space, ease of assembly, high energy absorption capability and smallest possible weight as well as acceptable costs. In particular, the pursuit for reducing $CO_2$ emission demands a rigorous realization of a lightweight construction when designing vehicles.

It would therefore be desirable and advantageous to provide an improved bumper to obviate prior art shortcomings and to improve its behavior in the event of a crash while still being simple in structure and lightweight with optimized energy absorption capability.

SUMMARY OF THE INVENTION

According to one aspect of the present invention, a bumper of a motor vehicle includes a cross member disposed transversely to a side rail of a motor vehicle frame and having a U-shaped cross section formed by a wall and two legs which extend from the wall, and a reinforcement member having a T-shaped cross section and extending in longitudinal direction of the cross member.

The present invention resolves prior art problems by providing a T-shaped reinforcement member to reinforce the cross member. The combination of cross member and reinforcement member results in an improvement of the geometric configuration of the system in relation to the moment of resistance as well as strength and stiffness behaviors so that the overall weight of the bumper can be reduced.

According to another advantageous feature of the present invention, the cross member and the reinforcement member may be made of different materials to best suit the situation at hand.

According to another advantageous feature of the present invention, the cross member may involve a hot-formed steel sheet part.

According to another advantageous feature of the present invention, the reinforcement member may involve a hollow section. Suitably, the hollow section is a closed thin-walled hollow section and may be made of light metal, e.g. aluminum or an aluminum alloy. The reinforcement member may also involve an extruded part or may be made of steel. In the latter case, the reinforcement member may involve a roll-formed part.

According to another advantageous feature of the present invention, the cross member has a front end which can be closed by the reinforcement member. As a result, the reinforcement member forms a mounting plate on the front side for support of the legs of the cross member. The cross member with its wall is directed towards the motor vehicle, while the legs of the cross member face away from the motor vehicle, i.e. towards the outer side. The reinforcement member has a front end which defines a head portion to close the cross member, and a center portion which points in a direction of the wall of the cross member and projects into the cross member.

According to another advantageous feature of the present invention, the legs of the cross member may be placed in touching relationship with the head portion of the reinforcement member for support thereon. The head portion has hereby free ends which can project laterally beyond the legs. Advantageously, the legs of the cross member and the head section of the reinforcement member are joined to one another, e.g. by welding or gluing.

According to another advantageous feature of the present invention, the center portion of the reinforcement member can be placed in touching relationship with the wall of the cross member for support thereon. As a result, stress behavior in particular in relation to stiffness and force dissipation in the event of an impact is further enhanced. Suitably, also the center portion of the reinforcement member and the wall of the cross member can be joined to one another, e.g. by welding or gluing. Also conceivable is a clinched connection. This may be realized from one side of the wall of the cross member.

According to another advantageous feature of the present invention, the cross member has a central length portion and end portions which are respectively connected to opposite ends of the length portion and can have a wider configuration than the length portion. Each end portion may have an attachment zone for attachment of a crash box. The attachment zones for attachment of the crash boxes result in an introduction of the impact energy under conditions that best conform to the load while causing a minimum bending moment in the crash boxes.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
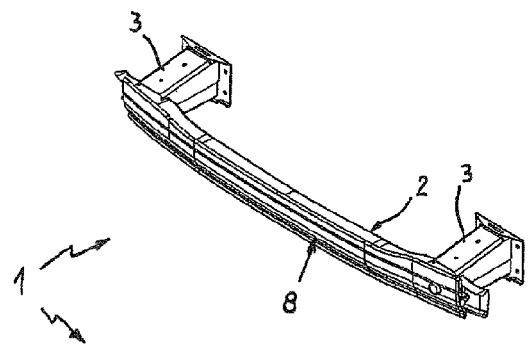
FIG. 1 is a top, front and side perspective illustration of a bumper according to the present invention for a motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top, front and side perspective illustration of a bumper according to the present invention, generally designated by reference numeral 1, for a motor vehicle. The bumper 1 includes a cross member 2 which extends transversely to unillustrated side rails of a motor vehicle and is secured thereto. The cross member 2 is hereby supported on the side rails through intervention of crash boxes 3. The crash boxes 3 are provided to absorb in addition to the cross member 2 the energy caused by an impact and to convert the impact energy into deformation work.

The cross member 2 is made from sheet metal, in particular a hot-formed steel plate, and has a U-shaped cross section with a wall 4 and two legs 5, 6 which extend from the wall 4. The wall 4 of the cross member 2 is disposed on a side 7 of the cross member 2 in confronting relationship to the motor vehicle. The cross member 2 has a front end which is closed by a reinforcement member 8.

The reinforcement member 8 has a T-shaped configuration and extends in longitudinal direction of the cross member 2. The reinforcement member 8 is formed by a thin-walled hollow section and can be made of light metal or steel. When made of light metal, the reinforcement member 8 is made in particular of aluminum, aluminum alloy, or magnesium or magnesium alloy and is manufactured by an extrusion process. When made of steel, the reinforcement member 8 is advantageously roll-formed and welded along a longitudinal seam.

The reinforcement member 8 has a head portion 9 on a front end thereof and a center portion 10. The head portion 9 of the reinforcement member 8 closes the cross member 2, as shown in particular in FIG. 4. The center portion 10 of the reinforcement member 8 points in the direction towards the wall 4 and projects into the cross member 2. The center portion 10 has an end 11 which touches the wall 4 of the cross member 2, as shown in FIG. 3.

Figure 3:
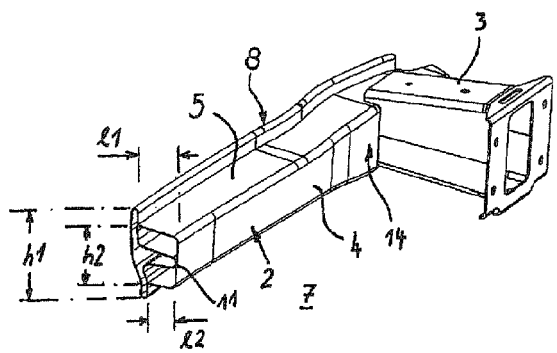
FIG. 3 is a top, rear and side perspective illustration, on an enlarged scale, of a detail of the bumper as viewed from the motor vehicle.
Figure 4:
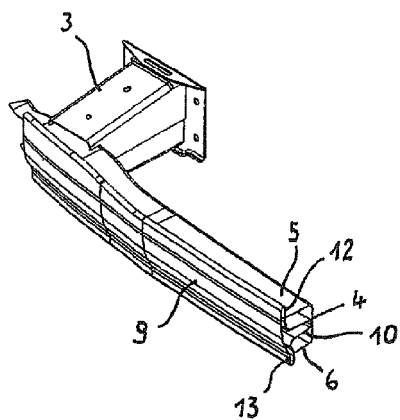
FIG. 4 is a top, front and side perspective illustration of the detail of FIG. 3.

The legs 5, 6 of the cross member 2 extend from the wall in a direction of the head portion 9 of the reinforcement member 8 and touch the head portion 9 (FIGS. 3, 4). The free ends 12, 13 of the head portion 9 project hereby laterally beyond the upper leg 5 and lower leg 6, respectively. As a result, the head portion 9 of the reinforcement member 8 has a vertical height h1 which is greater than the vertical height h2 of the cross member 2, as measured between the legs 5 and 6. In addition, the upper leg 5 of the cross member 2 has a length l1 which is greater than a length l2 of the lower leg 6, as shown in FIG. 3. To conform to this configuration of the legs 5, 6, the head portion 9 has a curved configuration in the shape of an S, with the lower end 13 of the head portion 9 being recessed with respect to the upper end 12 in a direction of the motor vehicle (FIG. 4).

Figure 2:
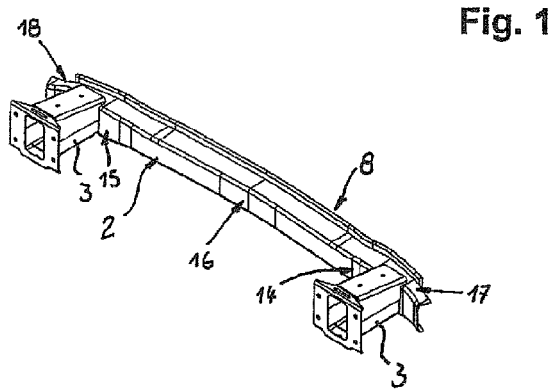
FIG. 2 is a top, rear and side perspective illustration of the bumper of FIG. 1.

As shown in FIG. 2, the crash boxes 3 are affixed to the cross member 2 via attachment zones 14, 15 which are formed in end portions 17, 18, respectively. The end portions 17, 18 have hereby a width which is wider than a width of a central length portion 16 of the cross member 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A bumper of a motor vehicle, comprising:
a cross member disposed transversely to a side rail of a motor vehicle frame and having a U-shaped cross section formed by a wall and two legs which extend from the wall; and
a reinforcement member having a T-shaped cross section and extending in longitudinal direction of the cross member, said reinforcement member having a front end which defines a hollow double-wall head portion to close the cross member,
wherein the legs of the cross member are in touching relationship with the hollow double-wall head portion of the reinforcement member.

2. The bumper of claim 1, wherein the cross member and the reinforcement member are made of different materials.

3. The bumper of claim 1, wherein the cross member is a hot-formed steel sheet part.

4. The bumper of claim 1, wherein the reinforcement member is made of light metal.

5. The bumper of claim 1, wherein the reinforcement member is made of aluminum.

6. The bumper of claim 1, wherein the reinforcement member is an extruded part.

7. The bumper of claim 1, wherein the reinforcement member is made of steel.

8. The bumper of claim 7, wherein the reinforcement member is a roll-formed part.

9. The bumper of claim 1, wherein the wall of the cross member are disposed in confronting relationship to the motor vehicle, and the legs of the cross member face away from the motor vehicle, said reinforcement member having a center portion which projects into the cross member.

10. The bumper of claim 9, wherein the hollow double-wall head portion has free ends which project laterally beyond the legs.

11. The bumper of claim 10, wherein the hollow double-wall head portion of the reinforcement member has a vertical height which is greater than a vertical height of the cross member in an area between the legs.

12. The bumper of claim 1, wherein the legs define an upper leg and a lower leg, said upper leg of the cross member defined by a length which is greater than a length of the lower leg.

13. The bumper of claim 9, wherein the hollow double-wall head portion has in vertical orientation a curved configuration in the shape of an S to define an upper end and a lower end, wherein the lower end of the head portion is recessed with respect to the upper end in a direction of the motor vehicle.

14. The bumper of claim 9, wherein the center portion of the reinforcement member is in touching relationship with the wall of the cross member.

15. The bumper of claim 14, wherein the center portion of the reinforcement member and the wall of the cross member are joined to one another.

16. The bumper of claim 1, wherein the cross member has a central length portion and end portions respectively connected to opposite ends of the length portion and having a wider configuration than the length portion, each said end portion having an attachment zone for attachment of a crash box.

17. The bumper of claim 1, wherein the cross member and the reinforcement member are separate parts and coupled to one another.

* * * * *

UNITED STATES PATENT AND TRADEMARK OFFICE
CERTIFICATE OF CORRECTION

| | | |
|---|---|---|
| PATENT NO. | : 8,079,624 B2 | Page 1 of 1 |
| APPLICATION NO. | : 12/686723 | |
| DATED | : December 20, 2011 | |
| INVENTOR(S) | : Michael Roll and Elmar Mollemeier | |

It is certified that error appears in the above-identified patent and that said Letters Patent is hereby corrected as shown below:

IN THE SPECIFICATIONS:

Column 4, line 20, before "What is claimed is...", insert

--[0029] What is claimed as new and desired to be protected by Letters Patent is set forth in the appended claims and includes equivalents of the elements recited therein:--

Signed and Sealed this
Fourteenth Day of February, 2012

David J. Kappos
*Director of the United States Patent and Trademark Office*